(12) United States Patent
Chelle et al.

(10) Patent No.: US 11,382,313 B2
(45) Date of Patent: Jul. 12, 2022

(54) COLLAR TIGHTENING STRUCTURE

(71) Applicant: AB7 Innovation S.A.S.U., Deyme (FR)

(72) Inventors: René Chelle, Deyme (FR); Arnaud Vilbert, Baziege (FR); Giovanni Chabot, Toulouse (FR)

(73) Assignee: AB7 INNOVATION S.A.S.U., Deyme (FR)

( * ) Notice: Subject to any disclaimer, the term of this patent is extended or adjusted under 35 U.S.C. 154(b) by 148 days.

(21) Appl. No.: 16/759,558

(22) PCT Filed: Oct. 22, 2018

(86) PCT No.: PCT/FR2018/000238
§ 371 (c)(1),
(2) Date: Jun. 17, 2020

(87) PCT Pub. No.: WO2019/081822
PCT Pub. Date: May 2, 2019

(65) Prior Publication Data
US 2020/0315139 A1 Oct. 8, 2020

(30) Foreign Application Priority Data

Oct. 26, 2017 (FR) ...................................... 1771129

(51) Int. Cl.
*A01K 27/00* (2006.01)
*A44B 11/22* (2006.01)
(52) U.S. Cl.
CPC .......... *A01K 27/005* (2013.01); *A01K 27/001* (2013.01); *A44B 11/22* (2013.01)

(58) Field of Classification Search
CPC .... A01K 27/005; A01K 27/00; A01K 27/001; B65D 63/1072; B65D 63/1081; B65D 63/1027; A44B 11/22; A44B 11/06; A44B 11/10; A44B 11/20
See application file for complete search history.

(56) References Cited

U.S. PATENT DOCUMENTS

| 2,900,696 A | * | 8/1959 | Bacon | ..................... A44B 11/20 24/595.1 |
| 7,730,592 B2 | * | 6/2010 | Krisel | ................ B65D 63/1072 24/16 PB |
| 2014/0223696 A1 | * | 8/2014 | O'Regan | ............ B65D 63/1072 24/16 PB |
| 2017/0202183 A1 | | 7/2017 | Lou | |
| 2021/0029970 A1 | * | 2/2021 | Davis | ................... A01K 27/005 |

FOREIGN PATENT DOCUMENTS

| DE | 102012100385 | 7/2013 | |
| FR | 2005940 | 12/1969 | |
| FR | 2180539 | 11/1973 | |
| WO | WO-2017123869 A1 * | 7/2017 | ......... B65D 63/1081 |

* cited by examiner

*Primary Examiner* — Kristen C Hayes
(74) *Attorney, Agent, or Firm* — Benoit & Cote Inc.

(57) ABSTRACT

The present invention relates to a collar (1) for pets, the collar (1) comprising a tightening structure consisting of a buckle (2) having a first projecting structure (21) formed longitudinally on the top (23a) and a second projecting structure 22a formed transversely to the center of the bottom (23b) of the buckle (2), the first and second projecting structures (21, 22a) facing one another without touching.

10 Claims, 2 Drawing Sheets

COLLAR TIGHTENING STRUCTURE

Figure 1:
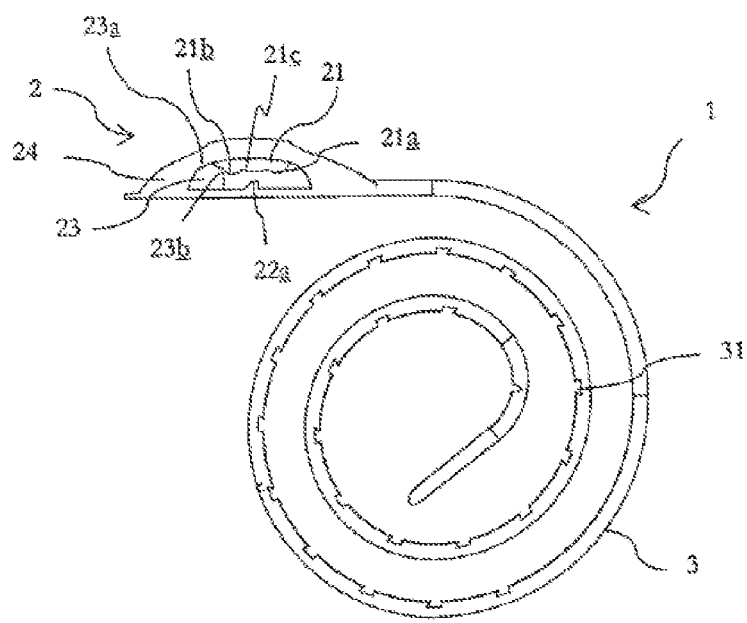

The present invention is in the field of closure structures for collars worn by pets. In particular, the invention relates to a structure for closing and tightening a collar comprising a hollow buckle which has, in its interior space, two projecting structures which face one another so as to tighten a notched strap that passes through said buckle.

Plastics collars worn by pets, in particular dogs, often come off during use, which is a drawback of these collars. This problem is often encountered in particular when a collar of this kind is used on a young, very playful animal or when an animal scratches itself with its legs. This is also true of plastics collars loaded with active material which is diffused over a long period of time, since the gradual release of the active material is likely to cause the plastics material to shrink until, in some cases, it causes the strap to become loose in the tightening structure, or even causes the strap to not be held therein.

The prior art proposes several solutions for overcoming the above-mentioned drawback. Collars are known, for example, that have an adjustment system comprising a metal buckle secured at one end of said system, said buckle comprising a pin which is inserted into a hole in the strap for securing and tightening purposes. Another variant comprises a metal buckle having a protrusion which is inserted into holes provided in the strap (see EP2047744). Other systems consist in providing a buckle capable of enclosing the straps in the manner of a "sandwich" (see FR2729833, FR2619989 and EP0488522). Another system comprises a flat metal buckle having two slots, but no interior space; the textile strap is inserted from below into the first slot, passes over the buckle, and is then inserted down into the second slot (see U.S. Pat. Nos. 534,380 and 5,000,125). Yet another system comprises a metal buckle provided with a hinged tongue which engages in an indentation in the strap for both fine adjustment and tightening of the collar (see FR2841739, U.S. Pat. Nos. 6,715,449, 5,749,127 and WO2008155791). Yet another variant comprises a buckle which is provided with two portions, namely a male portion and a female portion, and which is closed by the male portion being snap-fitted into the female portion (see U.S. Pat. No. 6,378,466).

All the collar tightening systems described in the prior art are made up of at least one removable buckle secured to a strap. The manufacturing process for these systems therefore requires an additional assembly or securing step.

The present invention is intended to provide a collar for a pet which has a tightening structure comprising a buckle that forms a one-piece assembly together with the strap of the collar, and for which sufficient tightening is sought so as to prevent said collar from coming off when being worn by the animal.

The present invention therefore relates to a one-piece collar made of flexible plastics material and intended to be worn by a person or a pet, said plastics material being capable of containing an active material, the collar comprising a tightening structure consisting of a buckle located substantially on the proximal part of said collar, namely a buckle of which the hollow interior defines a tunnel delimited by a top on the upper part thereof and by a bottom on the lower part thereof, said tunnel being capable of receiving, longitudinally and by threading, a strap which forms the distal part of the collar, namely a strap of which the inner face intended to be in contact with the bottom of the buckle has a plurality of indentations which pass all the way therethrough, characterized in that a first projecting structure is formed longitudinally on the top of the buckle and a second projecting structure is formed transversely to the center of the bottom of the buckle, the first and second projecting structures facing one another without touching, in that the space between the first projecting structure and the bottom is intended for having the strap pass therethrough such that, when the strap is threaded inside the buckle and in order for the collar as a whole to be tightened, the first projecting structure abuts the top face of said strap so as to exert a local holding pressure thereon, and in that the second projecting structure engages with an indentation in the underside of said strap.

Advantageously, the local holding pressure exerted on the strap causes slight deformation thereof.

According to one embodiment, the first projecting structure formed longitudinally on the top of the buckle also has two bulges each located at one of the ends of said projecting structure such that said bulges straddle the indentation in the strap so as to clamp around said strap.

According to one embodiment, the central part of the first projecting structure is slightly set back from the two bulges.

According to one embodiment, the second projecting structure formed transversely to the center of the bottom of the buckle forms a tooth of which the lateral part located on the side opposite to the insertion direction of the strap is at least on a line with the bottom of the buckle or is slightly inclined toward the threading direction of the strap, and this makes it possible to strengthen the grip of the notch should the stresses on the collar as a whole cause the strap introduced into the buckle to come undone.

The space between the bulge and the bottom is symbolized by "y"; the space between the upper part of the tooth and the edge of the bulge is symbolized by "x"; "EL" represents the thickness of the strap and "EC" symbolizes the thickness of the strap in the notch, the value of which is equal to the difference between the thickness (EL) of the strap and the depth "p" of an indentation.

According to one embodiment, the value of the ratio (x/y) is substantially proportional to that of the ratio (thickness of the notch to thickness of the strap) according to the relationship $0.9\ EC/EL < x/y < 1.1\ EC/EL$. According to this equation, the constants 0.9 and 1.1 correspond to the degrees of relative tolerance of the tightening which results in a slight freedom of movement of the strap inserted into the buckle. Following this equation, it becomes possible to vary both the values of "x" and those of "y" for any dimension of a collar or more generally of a device comprising a tightening structure identical to that according to the present invention.

For example, for a collar intended to be worn by a pet, the value of the space "x" between the central part of the first projecting structure and the tooth is between 1.2 and 2.1 mm and the value of the space "y" between the bulge and the bottom is between 2 and 3.2 mm.

According to one embodiment, the bottom comprises, in addition to the tooth on the central part, a tooth on the proximal part of the buckle and another tooth on the distal part of the buckle.

According to one embodiment, the teeth are equidistant by a length corresponding to the spacing between two successive indentations such that each of the two teeth engages with indentations when the strap is threaded into the buckle.

According to one embodiment, the indentation in the strap has a cross section that is substantially in the shape of a parallelogram, antiparallelogram, triangle or a combination of these shapes. The indentation preferably has a cross section that is substantially in the shape of an antiparallelogram.

According to one embodiment, the buckle has openings in each of its lateral faces, said openings delimiting a constriction structure for both the top and the bottom of the buckle, the top and the bottom of the buckle being interconnected by lugs.

The buckle and the strap form a one-piece assembly made of flexible plastics material that is well known to a person skilled in the art. The thermoplastic polymers are biodegradable or non-biodegradable polymers selected from the group made up of polyolefins and their derivatives, selected from polyethylenes (PE), polypropylenes (PP), copolymers of ethylene and vinyl acetate (EVA), ether block amides (EBA), polyvinyl chlorides (PVC), polyamides, copolyamides and their derivatives, polyurethanes and their derivatives, styrenics and their derivatives, selected from polystyrene-poly(ethylene-butylene)-polystyrenes (SEBS) copolymers, polystyrene-polyisoprene-polystyrene (SIS) copolymers, polystyrene-polybutadiene-polystyrene (SBS) copolymers, vulcanized thermoplastics, agropolymers and their derivatives (polysaccharides, starch, cellulose, proteins), polyesters and their derivatives, as well as a mixture of all of these polymers.

Advantageously, the hardness of the flexible plastics material from which the collar is made is between 60 Shore A and 60 Shore D, preferably between 80 and 95 Shore A.

According to one embodiment, the collar contains an active material that has a biocidal, medicinal or cosmetic effect. More particularly, the active material is suitable for achieving a treatment action selected from an insecticide action, insect repellant action, attractive action, antifungal action, soothing action, calming action, fragrant action, wellness action or a combination thereof. In a known manner, without the following list being exhaustive, the active material is selected from the group made up of essential oils, the main constituents of essential oils and their derivatives, pyrethroids, carbamates, formamidines, icaridin, DEET, nicotinyl compounds and their derivatives, pyrethrins, plant extracts and macerates, vegetable oils, alkaloids, perfumes, non-steroidal anti-inflammatory drugs (NSAIDs).

In order to fully understand the invention, the following figures are provided to illustrate a preferred embodiment of the invention, without limiting its scope, however.

FIG. 1: front view of the collar according to the invention

Figure 2:
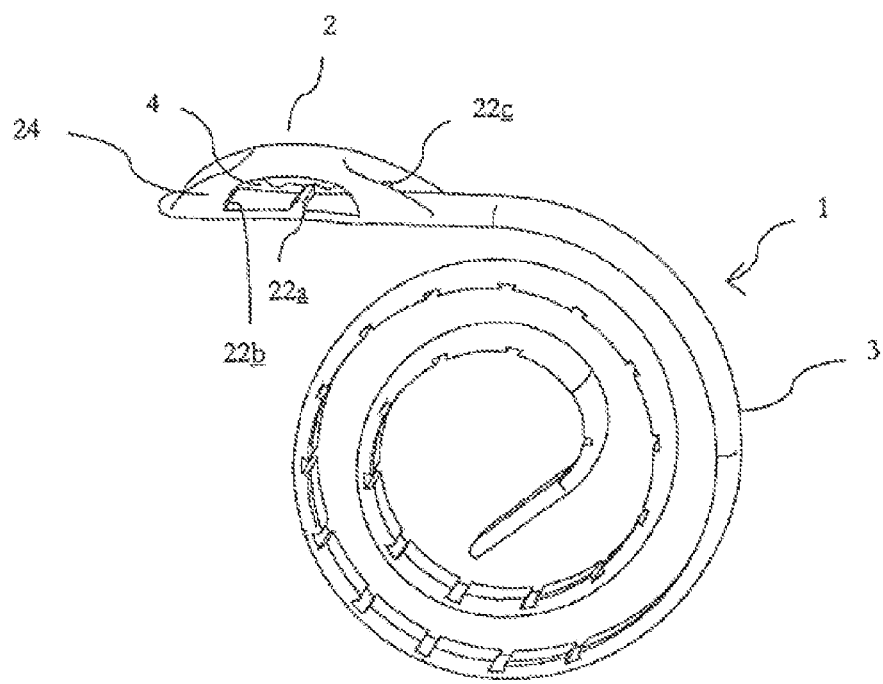

FIG. 2: perspective view of the collar according to the invention

Figure 3:
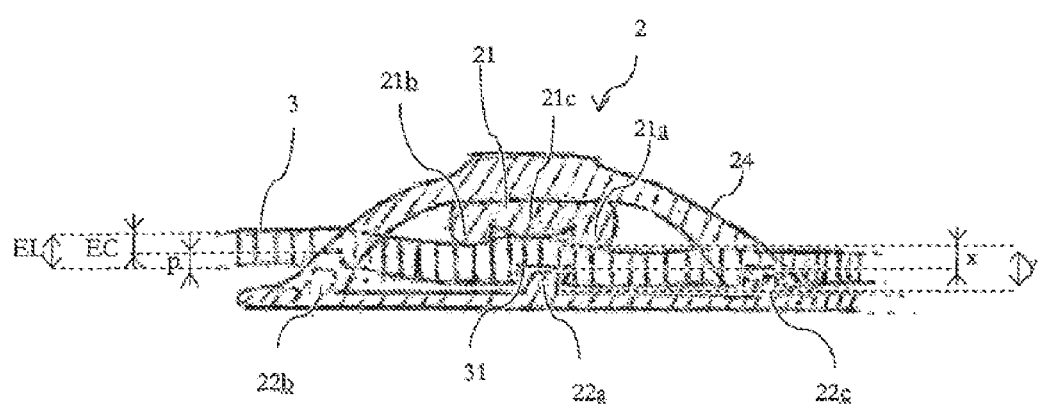

FIG. 3: cross-sectional view of the strap threaded into the buckle, showing the way in which the collar is tightened according to the invention.

FIG. 1 shows a collar 1 of which the proximal part comprises a buckle 2 and of which the distal part forms a strap 3 having a plurality of indentations 31 which pass all the way therethrough. The interior of the buckle 2 is hollow and defines a tunnel 23 of which the upper part forms a top 23a and of which the lower part forms a bottom 23b. The top 23a has a projecting structure 21, the two ends 21a and 21b of which each form a bulge which protrudes beyond the central part 21c. The central part of the bottom 23b has a tooth 22a, the tip of which faces the lower part of the projecting structure 21, specifically in line with the central part 21c. The top 23a of the buckle 2 is connected to the strap 3 by means of the lugs 24.

In FIG. 2, it can be seen that the bottom 23b of the buckle 2 also has two other teeth 22b and 22c on the proximal part and the distal part of the buckle 2, respectively. In this figure, it can be seen that the buckle 2 has an opening 4 in the two lateral faces, namely the left and right faces.

From the sectional view in FIG. 3, it can be seen that the strap 3 is threaded into the tunnel of the buckle 2. Each of the teeth 22a, 22b and 22c engages with indentations 31. The two ends 21a and 21b of the projecting structure 21 straddle the tooth 22a such that the part 21c abuts the part where the indentation 31 is located so as to exert slight pressure on both sides of the tooth 22a in order to clamp the strap 3 such that the tooth 22a fits into the indentation 31. This results in the strap 3 being tightened in the buckle 2. The teeth 22b and 22c provide support and effective positioning of the strap 3 inside the buckle 2. In this figure, the space between the bulge (21a, 21b) and the bottom 23b is symbolized by "y," the space between the upper part of the tooth 22a and the edge of the bulge 21a is symbolized by "x," the thickness of the strap 3 is symbolized by "EL," the thickness of the notch is symbolized by "EC," and the depth of the notch is symbolized by "p." The values of the parameters x, y, EL and EC in the embodiment shown in this figure are 1.7 mm, 2.6 mm, 2.47 mm and 1.52 mm, respectively.

The tightening structure of the collar according to the invention has several advantages, particularly as a result of its simplicity, since the collar and the buckle form a one-piece assembly, and this facilitates shaping by known plastics processing techniques. Furthermore, tests on pets were able to confirm that the collar according to the invention does not come undone when the pet is scratching, unlike other collars of the same type, which clearly demonstrates the effectiveness of the tightening structure.

Yet another advantage of the collar according to the invention is that it is possible to adapt the dimensions of the collar as a whole, while maintaining the same design of the buckle.

Clearly, the invention is not limited to the embodiments described and shown, but also covers other variants, in particular bracelets and bindings that are tightened in an adjustable and reversible manner.

The invention claimed is:

1. A one-piece collar made of flexible plastics material and intended to be worn by a person or a pet, said plastics material being capable of containing an active material, the collar comprising:
 a tightening structure consisting of a buckle located substantially on the a proximal part of said collar, the buckle having a hollow interior that defines a tunnel delimited by a top on the upper part thereof and by a bottom on the lower part thereof, said tunnel being capable of receiving, longitudinally and by threading, a strap which forms a distal part of the collar, the strap including an inner face intended to be in contact with the bottom of the buckle and having a plurality of indentations, wherein:
 a first projecting structure is formed longitudinally on the top of the buckle, the first projecting structure including two bulges each located at one of the ends of said projecting structure;
 a second projecting structure is formed transversely to the center of the bottom of the buckle, such that the first and second projecting structures face one another without touching, and a space (y) between the first projecting structure and the bottom is capable of having the strap pass therethrough such that, when the strap is threaded inside the buckle, the first projecting structure abuts a top face of said strap so as to exert a local holding pressure thereon, and the second projecting structure engages with an indentation in an underside of said strap; and a value of a ratio (x/y) is substantially proportional to that of a ratio of a notch thickness to a strap thickness according to the relationship 0.9 EC/EL<x/y<1.1 EC/EL, wherein the space between the first projecting structure and the bottom is symbolized by "y", a space between the second projecting structure and the edge of one of said bulges is symbolized by "x"; "EL" represents the strap thickness and "EC" symbolizes the notch thickness, the value of which is equal to a difference between the thickness (EL) of the strap and a depth of one of said indentations.

2. The one-piece collar according to claim 1, wherein said bulges straddle the indentation in the strap when the strap is threaded inside the buckle so as to clamp around said strap.

3. The one-piece collar according to claim 2, wherein a central part of the first projecting structure is slightly set back from the two bulges.

4. The one-piece collar according to claim 1, wherein the second projecting structure forms a tooth of which a lateral part located on the side opposite to an insertion direction of the strap is at least on a line with the bottom of the buckle or is slightly inclined toward the threading direction of the strap.

5. The one-piece collar according to claim 1, wherein the second projecting structure forms a central tooth and wherein the bottom comprises, in addition to the central tooth, a proximal tooth on a proximal part of the buckle and a distal tooth on a distal part of the buckle.

6. The one-piece collar according to claim 5, wherein the proximal tooth, central tooth and distal tooth are spaced from one another by a length corresponding to a spacing between said indentations such that each of the teeth engages with one of said indentations when the strap is threaded into the buckle.

7. The one-piece collar according to claim 1, wherein each of said indentations in the strap has a cross section that is substantially in the shape of a parallelogram, antiparallelogram, triangle or a combination of these shapes.

8. The one-piece collar according to claim 1, wherein the buckle has openings in each of its lateral faces, said openings delimiting a constriction structure for both the top and the bottom of the buckle, the top and the bottom of the buckle being interconnected by lugs.

9. The one-piece collar according to claim 1, wherein a hardness of the flexible plastics material from which the collar is made is between 60 Shore A and 60 Shore D.

10. The one-piece collar according to claim 1, wherein the collar contains an active material that has a biocidal, medicinal or cosmetic effect, said active material being suitable for achieving a treatment action selected from an insecticide action, insect repellant action, attractive action, antifungal action, soothing action, calming action, fragrant action, wellness action or a combination thereof.

* * * * *